April 13, 1954     A. T. COMISKEY, SR     2,675,266
MOTORCYCLE WINDSHIELD
Filed Nov. 12, 1948
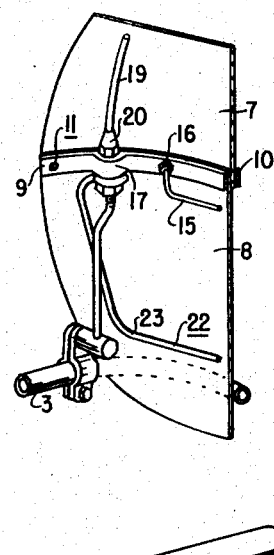
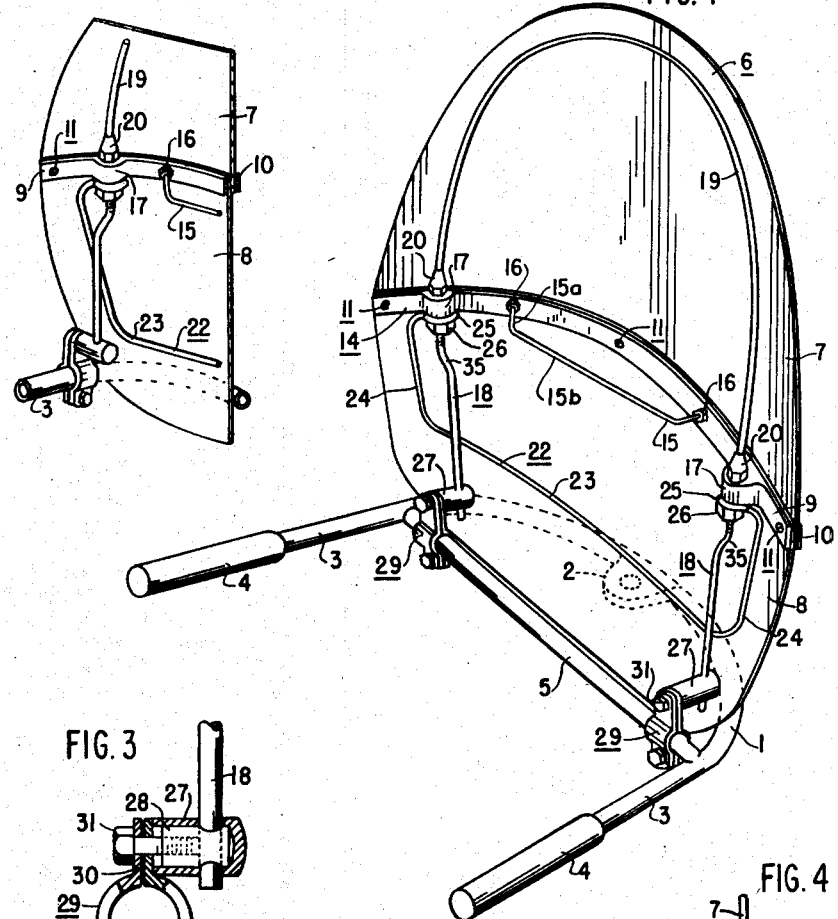
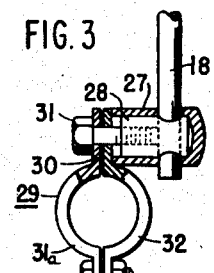
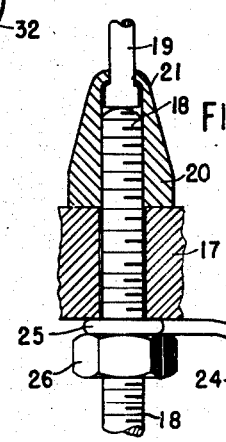
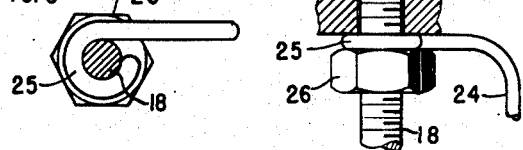
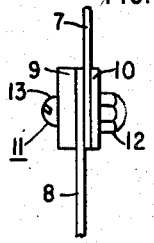
*INVENTOR.*
ANTHONY THOMAS COMISKEY SR.
BY Soans Pond & Anderson
ATTORNEYS Patented Apr. 13, 1954

2,675,266

UNITED STATES PATENT OFFICE 2,675,266

MOTORCYCLE WINDSHIELD

Anthony T. Comiskey, Sr., Chicago, Ill.

Application November 12, 1948, Serial No. 59,557

4 Claims. (Cl. 296—78.1)

This invention relates, in general, to a motorcycle windshield, and more particularly to the structural framework arrangement for supporting such motorcycle windshield.

A desirable type of motorcycle windshield comprises a sheet of flexible, transparent material, shaped in a somewhat arcuate, streamlined fashion and adapted to be mounted forward of the operator in a shielding manner.

Although such windshield construction is old in the art, the use of such windshield has been somewhat restricted, prior to my patent Reissue #23,039, issued September 21, 1948, for lack of a suitable supporting framework structure or, in the event of the provision of a framework designed to offer the required strength and rigidity, the size of the framework members and their location has generally been such as to materially impair and reduce the range of vision of the vehicle operator, and to produce a heavy or objectionably massive appearance.

Additionally, in use of the normal type windshield, the vision of the operator during operation has been further hampered by the blinding rays which are normally reflected from the road surfaces through the windshield to the operator. As a result of such construction, the windshields have generally not been adequate for their designed purpose.

The object of the invention, therefore, is the provision of a windshield of the subject type which is of an adequately sturdy, rugged construction, of neat appearance, and which comprises a structural framework arrangement which eliminates the disadvantages inherent in most older motorcycle windshield structures.

Other objects and advantages of the invention will become apparent upon reference to the following specification, accompanying drawing, and claims.

In the drawing,

Fig. 1 is a perspective view of the windshield attached to a motorcycle handlebar structure, Fig. 2 is a fragmentary illustration of another manner in which the windshield may be attached to a motorcycle handlebar structure.

Fig. 3 is a detailed illustration of the clamping means for attaching the windshield to the handlebars.

Figs. 4, 5 and 6 are fragmentary views illustrating various details of the windshield construction.

In the drawing, Fig. 1 illustrates a motorcycle handlebar construction of the braced type, which comprises a main tubular member 1, bent to a more or less U shape, and which is provided at the approximate midpoint of its base portion with means, in the form of a centrally located apertured lug 2, for securing the handlebar structure to the front wheel fork of a motorcycle. The side arms 3 of the handlebar have their free ends provided with grips 4 which are usually of rubber or other suitable material.

In one modification of the motorcycle handlebar structure, a transversely extending tube 5 is fixedly mounted across the lower segment of the U-shaped member 1 substantially as shown in Fig. 1. In a second modification, such as shown at Fig. 2, the transverse member is eliminated by the provision of a material which will effect a U-shaped member sufficiently rigid in itself for handlebar purposes.

The main windshield member 6 comprises a curved, horizontally arcuate streamlined shaped screen which, in the illustrated embodiment, comprises a pair of transparent sheets, 7 and 8, of flexible plastic material, joined by suitable frame supporting members 9 and 10. It is to be understood that the screen could likewise comprise a single sheet of flexible plastic material formed to the illustrated contour and supported in the manner of the invention.

A pair of suitably arched, shield conforming, metal bracing members 9 and 10, which are the principal support members of the novel framework, are also effective to join the individual sections 7 and 8 of the windshield. The individual sections 7 and 8 are supported between the arched members 9 and 10 with the lower edge of the upper transparent member 7 terminating adjacent the lower edges of the arched members 9 and 10 and the upper edge of the lower transparent member 8 terminating adjacent the upper edge of the arched members 9 and 10. A rigid joining of the individual overlapping shield segments 7 and 8 is effected by means of a plurality of bolt and nut assemblies 11 which extend through the ends and center of the arched members 9 and 10 and the overlapping portions of the transparent members 7 and 8 therebetween. The said bolt and nut assemblies comprise hexagonal head nuts 12 and screws or bolts 13.

The split-type windshield 6 may be comprised of any suitable flexible plastic material. However, in the preferred embodiment, the upper section 7 comprises transparent, flexible sheeting having polarizing characteristics which effectively prevent objectionable, blinding light rays from reaching the motorcycle operator. Use of such material in the windshield construction obviously results in safer motorcycle operating conditions.

The lower edge of the lower windshield member 8 is here shown as having a substantially straight lower edge to approximately register with the brace bar 5, but said edge may be suitably recessed or otherwise shaped to fit over the upper longitudinal members of the motorcycle frame, or over other parts of the motorcycle, in a manner that will permit the turning movement of the handlebar 1 for steering purposes. Such lower shield section 8 may be of clear, flexible, transparent, light-colored plastic material. The preferred embodiment would utilize a plastic shield of a color substantially different from the color of upper section 7 to effect an eye-appealing shield. Additionally, use of a properly selected colored plastic for the lower section will shield the motorcycle instrument panel to facilitate the reading of the instruments thereon.

The arched support members 9 and 10 which serve as the principal supporting portion of the framework structure 14 are braced by a utility bar 15 which is formed from fairly stiff, but more or less resilient metal material. The utility bar 15 is of shallow U-shaped form and has the end portions of its side legs rigidly secured to the curved midsection of the arched members 9 and 10, substantially as shown in Fig. 1. The free end portions of the said side legs are threaded and passed through suitable openings in the bars 9 and 10 and the intervening margins of the shield members 7 and 8. A cap nut on the end portions of the leg outside of the member 10 (like the cap nut 12, Fig. 4) effects a secured and rigid mounting for the bar, which cooperates with an inner nut 16 on each leg portion, to secure the members 7, 8, 9 and 10 tightly together at points intermediate said fastenings 11 and to fasten the utility bar 15 as aforesaid. This chord-like brace for the arched members 9 and 10 resists inward flexing of the central portions of said members 9 and 10 by the air forces encountered by the shield in movement of the vehicle. The employment of a pair of arched support members 9 and 10 in a laminated arrangement imparts considerable strength to the principal supporting member. The additional chord-like brace is further effective as a material strengthening member for the pair in a manner which will not impair the range of visibility of the vehicle operator.

The bar 15, in addition to its action as a bracing member, has been adapted for use as a utility bar. The inwardly extending angled arms 15a of the bar cause the principal bar length 15b to be spaced from the outwardly curved arched support members 9 and 10, whereby such length may be adapted for the holding of items such as road maps, gloves and other similar articles for convenient access thereto.

The inner support member 9 has a pair of bosses 17 near its opposite ends, each of said bosses being suitably drilled to receive a mounting rod 18 therein. Mounting rods 18 have upper end portions threaded and these portions are inserted into the openings in the portions of the threaded segment of the rod extending through and upwardly so that threaded portions extend above and below the upper and lower surfaces of the bosses 17. An upwardly-extending, arched bracing rod 19 for supporting the windshield upper segment 7 is mounted on the upper end portions of said rods 18. The upper bracing rod 19 is fashioned from a somewhat resilient material to conform approximately to the outer perimeter of the shield. The upper bracing rod 19, when so bent, is attached to the threaded portion of the upwardly extending threaded ends of mounting rods 18 by a pair of specially designed hexagonal cap nuts 20. The ends 21 of the arched rod 19 pass through the central portions of the hexagonal cap nuts 20, and are flared, as shown at 21, whereby the securing of the cap nuts 20 to the mounting rods 18 will cause the lower surface of the flared ends 21 to engage the upper end of the mounting rod 18, and the upper surface of the flared end 21 to engage the inner and upper end surface of the cap nut 20, whereby the rod 19 is securely clamped to the supporting rods and maintained in a substantially fixed position. The upper brace 19 is so formed that alignment of its end portion with the respective rods 18 will require compression of the side portions of the brace toward each other. Since the brace is made of resilient material, the resulting expansive force in the brace will serve to cause the end portions of the brace to seat tightly against the nuts 20. The brace is thereby held against rattling and the nuts against loosening, notwithstanding the shocks and vibrations to which apparatus of this type is continually subjected.

A lower, U-shaped brace 22, which is utilized as a supporting member for the lower segment 8 of the windshield structure, comprises a drawn steel wire rod of medium gauge material which is bent to an approximately U-shape, and comprises a base 23 which is slightly longer than the distance between the upper portions of the mounting rods 18 seated in the bosses 17, and a pair of arms 24 which are approximately one-half the length of the lower windshield segment 8. The upper ends of each of the arms 24 are bent to provide eyes 25 surrounding the supporting rod portion immediately under the said bosses, as shown in Figures 1, 5 and 6. The eyes 25 are clamped against the bosses 17 by lock nuts 26. The arms 24 and the base 23 are positioned between the lower shield section 8 and the mounting rods 18.

The lock nuts 26 are rotatively mounted on the lower threaded portion of the mounting rod 18 and, in their adjustment toward the associated bosses 17, are effective to secure the mounting rods 18 in fixed positions relative to their associated bosses 17, the brace 22 in a fixed position relative to the shield 6 and mounting rods 18, and the upper brace 19 in fixed position relative to the shield part 7 and the principal support members 9 and 10.

It is apparent that air pressure against the shield 6 will force the bracing element 22 into contact with the mounting rods 18, such pressure component being transmitted to the handlebar structure 5 and principal supporting members 9 and 10. The rigidity of the brace, rods, handlebars and supporting members will offer a sturdy resistance to the flexing of the lower windshield segment 8. It is important to note that the bracing members, which are individually strong, that is the upper and lower rod-like braces 19 and 22 and the pair of principal arched supporting members 9 and 10 reinforced by the utility bar 15, in combination, effect an entire framework structure of increased rigidity and strength. Moreover, the narrow dimensions and arrangement of these sturdy members in the windshield framework insures a minimum amount of interference with the driver's range of vision, and, therefore, a windshield which is extremely safe in use.

The lower ends of the mounting rods 18 pass through openings positioned near the outer ends of a pair of cylindrical members 27 and 28, which are cooperatively assembled with the upper flanges 30 of a clamp structure 29, the outer cylindrical or cap member 27 of the assembly being slidably mounted about the inner cylindrical member 28. Cylindrical member 27 is secured to the upwardly projecting ears 30 of the clamp structure 29 by conventional bolt means 31 inserted within a drilled and threaded bore located on the inner end of the cylinder 28. The clamp structure 29 is adapted to be secured to any tubular frame element such as the brace member 5 or the main portion of the handlebar element 3, and comprises two half-circle segments 31a and 32, which have depending ears or lugs 30 and 33 located at their opposing ends, the lower ears being drawn together by a nut and bolt assembly 34. By screwing the bolt 31 into the inner member 28, said member 28 is moved endwise relative to the cap 27. Lower end portions of the mounting rods 18 which passed through diametrically extending openings in said members 27 and 28, will be tightly gripped between opposite surfaces of the openings in said members.

The mounting rods 18 are provided intermediate their ends, preferably near their upper portions, with angularly disposed offset portions 35 whereby the mounting rods may be rotatably adjusted in the bosses 17 so as to position the lower portions of the rods 18 to cooperate with the clamps wherever positioned on the handlebar structure within a predetermined range of possible positions. When the mounting rods and clamps are properly adjusted, the clamping lock nuts 26 and the clamping bolts 31 and 34 should be tightened to lock the parts in their adjusted positions.

The improved construction of the cap member 27 insures a more positive friction grip with a larger mounting rod surface. Additionally, the cap-like form of member 27 serves to impart a neat and clean-cut appearance to the clamp. The outer clamp construction eliminates any need for plating or other special finish on the inner member 28.

The material of the individual members comprising the framework structure is such as to insure a structure of increased strength and rigidity, each of the novel supporting members arranged to add its individual strength to the combination framework to provide a windshield arrangement which is a distinct advancement in the art. Additionally, the arrangement and the dimensions of such members have been carefully developed to afford a minimum amount of interference with the operator's vision, such arrangement in cooperation with the special glare reducing material used in the windshield, effecting a structure which encourages safer operating conditions. Various features of the invention, believed to be novel, will become more apparent by reference to the following claims.

I claim:

1. In a motorcycle windshield, a transparent curved screen, a central transverse brace conforming to said screen curvature, extending across and secured to the back of said screen adjacent the middle thereof intermediate its top and bottom ends, a pair of bosses respectively carried by and extending rearwardly from said transverse brace near its ends, each of said bosses being vertically bored, mounting rods having upper threaded end portions extending through the bores with a portion of said threaded portion projecting above and below said bores, an arched rod extending upwardly from said brace with the end portions of said rod respectively vertically aligned with the upper end portions of said mounting rod, cap nuts disposed on the end portions of said arched rod and threaded on said projecting rod portions to connect said arched rod to said mounting rods, a U-shaped brace depending from said transverse brace and having its ends provided with eyes fitting around said mounting rods immediately below said bosses, nuts respectively engaged with the threaded portion of the rods located below the bosses and clamping said eyes against said bosses and also serving to pull said cap nuts tightly into engagement with the upper faces of said bosses so as to secure said mounting rods, said upwardly extending arched rod, and said depending U-shaped brace to said central transverse brace.

2. In a motorcycle windshield, a transparent curved screen, an arched brace conforming to said screen curvature extending across and secured to the back of said screen adjacent the middle thereof intermediate its top and bottom ends, a pair of bosses carried by said arched brace near its respective ends, each of said bosses being vertically bored, mounting rods having upper end portions extending through the bores in said bosses with a short end portion projecting thereabove, rod means extending upwardly from said bosses in supporting relation to the back of said screen, said rod means having transversely enlarged end portions seated on the upper ends of said projecting portions of said mounting rods, sleeve nuts rotatable about said enlarged end portions of said rod means and engageable with said enlarged portions to prevent displacement of said nuts from said rod means, said sleeve nuts also having threaded engagement with said projecting portions of said mounting rods to fixedly attach said rod means to said mounting rods, and nuts threaded on said mounting rods and engageable with the lower ends of said bosses for cooperating with said sleeve nuts to clamp said bosses between said nuts, thereby to secure said screen to said mounting rods.

3. In a motorcycle windshield, a transparent, curved screen, arched brace members conforming to said screen curvature and respectively extending across the front and back of said screen adjacent the middle thereof intermediate its top and bottom ends, a plurality of fastening means extending from one of said brace members to the other thereof and through said screen, said fastening means being located at mutually spaced points along the lengths of said braces and serving to clamp said braces together to grip said screen, a pair of mounting rods having upper end portions secured to said brace and depending from said brace members for attachment to a motorcycle handlebar structure, and a bar disposed in chord-like relation to the central portion of the arched brace member in back of said screen, the ends of said bar extending through said brace members and being provided with means for clamping said members together to supplement the clamping effect of said fastening means, said bar being operative to strengthen said members against flexing and constituting a support for accessories such as maps, gloves and other articles.

4. In a motorcycle windshield, a flexible, transparent, curved screen comprising upper and lower horizontally arcuate sections respectively having their lower and upper margins in mutually overlapped relation, a transverse brace having a pair of transverse, band-like members conforming to said screen curvature and respectively disposed over the front and back faces of said overlapped screen margins, means extending through said overlapped screen margins interconnecting said band-like members to clamp said overlapped screen margins together in substantially fixed relation, a pair of mounting rods respectively secured to and depending from spaced portions of said transverse brace for attachment to a motorcycle handle bar structure, said upper section comprising a material having polarizing characteristics to decrease the reflected rays received therethrough, and said lower section comprising plastic sheet material colored so as to reduce the intensity of light passing therethrough.

References Cited in the file of this patent

UNITED STATES PATENTS

| Number | Name | Date |
| --- | --- | --- |
| Re. 23,039 | Comiskey, Sr. | Sept. 21, 1948 |
| 1,059,948 | Neberle | Apr. 22, 1913 |
| 1,389,787 | Stanley | Sept. 6, 1921 |
| 1,404,807 | Tait | Jan. 13, 1922 |
| 1,532,008 | Walford | Mar. 31, 1925 |
| 1,604,870 | Asman | Oct. 26, 1926 |
| 1,729,086 | Premont | Sept. 24, 1929 |

FOREIGN PATENTS

| Number | Country | Date |
| --- | --- | --- |
| 257,255 | Germany | Mar. 3, 1913 |
| 281,506 | Great Britain | Dec. 8, 1927 |